US007493401B2

(12) United States Patent
Barsness et al.

(10) Patent No.: US 7,493,401 B2
(45) Date of Patent: Feb. 17, 2009

(54) BILLING ADJUSTMENT FOR POWER ON DEMAND

(75) Inventors: Eric Lawrence Barsness, Pine Island, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1065 days.

(21) Appl. No.: 10/824,053

(22) Filed: Apr. 14, 2004

(65) Prior Publication Data

US 2005/0235064 A1     Oct. 20, 2005

(51) Int. Cl.
    *G06F 15/16*     (2006.01)
(52) U.S. Cl. .................. 709/229; 370/231; 370/235; 705/1; 705/400
(58) Field of Classification Search .......... 709/229, 709/228
    See application file for complete search history.

(56) References Cited

U.S. PATENT DOCUMENTS

| 2002/0166117 | A1* | 11/2002 | Abrams et al. ............... 717/177 |
| 2003/0172145 | A1* | 9/2003 | Nguyen ..................... 709/223 |
| 2004/0030575 | A1* | 2/2004 | Fackre et al. ................ 705/1 |
| 2005/0228856 | A1* | 10/2005 | Swildens et al. ............. 709/200 |

* cited by examiner

*Primary Examiner*—John Follansbee
*Assistant Examiner*—Glenford Madamba
(74) *Attorney, Agent, or Firm*—Wood, Herron & Evans; Scott Stinebruner

(57) ABSTRACT

An apparatus, program product and method for determining a cost for using a standby resource that accounts for the cause for the resource's usage. A standby resource, such as a processor, is activated in response to a resource requirement. The cause of the resource requirement is automatically determined. The result of that automatic determination is used to determine a charge indicator for using the standby resource. For instance, performance code associated with a failure may be associated with a charge indicator. A user may later be billed according to the determined charge indicator, i.e., according to their actual use of the standby resource and/or their usage status.

10 Claims, 4 Drawing Sheets

BILLING ADJUSTMENT FOR POWER ON DEMAND

FIELD OF THE INVENTION

The present invention relates to computing systems, and more particularly, to managing temporary resources within a data processing environment.

BACKGROUND OF THE INVENTION

Computer resource requirements for commercial and government applications often fluctuate over time. For instance, a business may experience periods of peak activity that exceed comparable processing or memory requirements of other periods. In another scenario, sporadic or unexpected sales or employee growth may similarly burden existing computing resources with increased requirements. When faced with these increased resource demands, a user would conventionally have to purchase new hardware resources capable of accommodating the elevated computing needs. Such purchase requirements can represent a major, if not preclusive, expenditure for a user, who may have insufficient capital or time to react to rapid growth requirements.

To this end, computing architectures such as the power on demand (POD) design, developed by International Business Machines Corporation, allow customers to effectively rent resources such as processors on an as-needed basis. More particularly, a customer may temporarily enable standby processors that are initially dormant within their machine. Where desired, the standby processors are not included in the up front, baseline cost of the machine. As such, for a relatively smaller initial capital investment, a customer may activate and deactivate standby processors as needed for a fee.

Another type of power on demand design utilizes complete computer systems as standby resources. For example, in high availability systems, it may be desirable to utilize data mirroring, where the memory of a backup computer system is made to mirror the memory of a primary computer system. That is, the same updates made to the data on the primary system are made to the backup system. For instance, write input/output (I/O) requests executed in the memory of the primary computer system are also transmitted to the backup computer system for execution in the backup memory. In the event that the primary computer system experiences a failure or sequence of failures leading to a crash, the user ideally becomes connected to the backup computer system through the high availability network and continues operation at the same point using the backup computer data. Thus, the user can theoretically access the same files through the backup computer system on the backup memory as the user could previously access in the primary system.

In the context of capacity on demand, a standby resource may comprise such a backup system. That is, a resource that includes a network, computer, processor, memory or other computer asset may temporarily activate to mirror data in place of or otherwise compensate for a corresponding failed resource. In this manner, such selective utilization of standby resources provides customers with another layer of optimized access and usage. Conversely, capacity on demand systems supply system providers with a creative way to satisfy customer performance and cost requirements, while additionally providing an increased revenue source.

To this end, customer use of the standby resources must be monitored for billing and other accountability purposes. However, current billing practices require the payment of certain license and hardware fees related to the upkeep and management of standby resources, regardless of whether the resources are ever actually used in their backup capacity. Moreover, current billing practices make no allowance for the cause of the standby resource activation. For instance, a customer may be billed the same rate for standby resource usage irrespective of whether the standby resource was activated in response to an ordinary customer requirement or a provider problem. A sense of fairness and good business sense suggests that a customer who had to activate a standby resource because of ineffective code supplied by the provider should be entitled to a discounted rate.

Consequently, supervisory mechanisms are needed so that the billing company can properly account for the cause of standby resource usage. It may be desired, for example, to charge a higher fee for standby resources activated in the course of ordinary business than for those used in response to a provider error. There is thus a need for an improved manner of charging a customer for standby resource usage.

SUMMARY OF THE INVENTION

One embodiment consistent with the principles of the present invention includes an apparatus, method, and program product configured to determine a charge for using a standby resource that accounts for the cause for the resource's usage. More particularly, a standby resource, such as a processor, is activated in response to a resource requirement. A computer comprising a billing computer may determine use of the standby resource. Such determination may include receiving usage information from a client computer having the standby resource, for instance. The cause of the resource requirement is automatically determined. The result of that automatic determination may be used to determine a charge indicator for using the standby resource. As such, the charge indicator for using the standby resource may be determined according to the cause of the requirement. A user may later be billed according to the determined charge indicator, i.e., according to their actual use of the standby resource and/or their usage status.

Where applicable, the charge indicator is used to determine a cost that is billed to the user. To this end, a determined cause may be correlated to a code indicative of the cause. This determination may include correlating a code indicative of the cause to a rate used to determine the charge indicator and/or cost. The charge indicator may include a special rate pertaining to the customer, as well as a rate pertaining to the determined cause. To this end, a code associated with a cause may be retrieved from an electronic log. The time of which the standby resource was activated may be recorded for billing application considerations. A cause may include a performance problem. Other examples of causes may include hardware, software and user related actions. Such causes may include an action introduced by a programmatic fix. In any case, encoded adjustment data associated with the cause may be retrieved from a memory. The memory may be remote or local to an applicable operating system.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
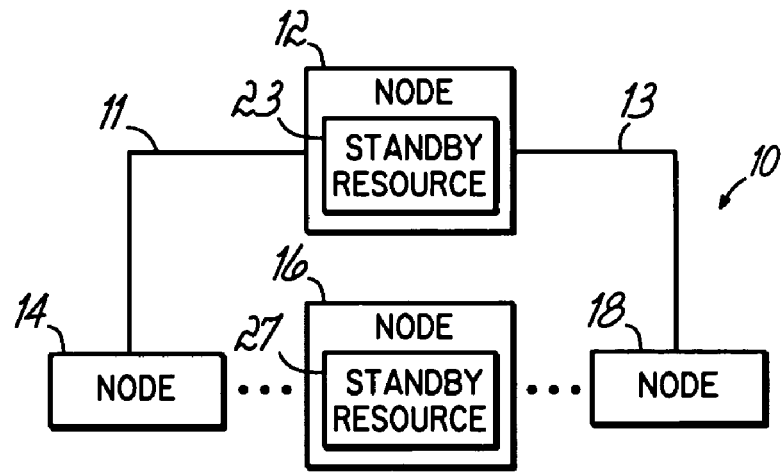
FIG. 1 is a block diagram of a computer system that includes clustered computers having standby resources that may be activated in response to a client requirement.

Embodiments consistent with the invention may expand the concept and use of power on demand in high availability and other environments. For instance, a system may be enabled that only charges a customer for standby resource usage when the system failure is determined to be the customer's fault. That is, a user may be billed according to the reason that the standby resource is activated. To this end, the cause for the activation of the standby resource is automatically determined. This determination may include retrieving a code indicative of the cause from a log. For example, when a number of different types of computers experience a failure, certain source reference codes, vertical licensed internal code logs, product activity logs, or other error codes known in the art are typically logged to enable a customer or provider to debug and understand what caused the system to fail. These error logs may indicate whether the error was a hardware error, an operating system error, an application error, etc. In this manner, a system knows about failures on a primary or other computer due to the process of receiving journal updates, etc. from the computer experiencing the failure. As described herein, an embodiment consistent with the invention thus may be able to capitalize on conventionally available error information to adjust a cost associated with usage of a standby resource based upon the reason for activating the standby resource.

As one example, a standby resource may be implemented as a backup computer system that operates as a data mirror to a primary computer system. When such a primary computer system experiences a failure, the backup system may activate in order to continue operation at the same point of the failure. When the primary system recovers from a crash, and the backup system is returned to its backup status, a billing server may access the error logs on the primary computer. Using the error codes (codes issued during the failure and recovery process) from the primary computer, a program on the primary computer may compare the code to an existing list of error codes to determine the cause of the failure. If a matching code cannot be found, the program may connect to a billing server on the Internet to look up information. Where desired, the primary system may always be in communication with a billing server in order to be able to customize POD cost adjustments based on the customer (i.e. bigger customers get better discounts, customers with recurring problems get treated specially, etc.) or just to allow flexibility in changing behavior.

Examples of errors where a provider may not charge a customer may include a hardware failure (processor, memory, power unit, etc.), and a new bug in an operating system or hypervisor. Examples of errors where a provider may charge a discounted rate may include: a failure of a disk drive in a non-protected environment, a failure of two drives in a RAID set if the first drive had been failed for over a week, as well as a bug in the operating system or hypervisor, but a Program Temporary Fix (PTF), or other software patch has been available for over a month. Examples of errors where the provider may charge the full rate may include an external loss of power (pulled plug, circuit breaker). Human intervention could certainly be allowed to adjust a customer's POD bill as well.

In further operation, in many embodiments, it will be known when a primary system went down as well as when the primary system went back into service. A system may access VLOGs and PAL entries on the primary computer. and send this information to a provider billing computer for analysis, and receive a reply. The primary computer may compare the error logs and recovery logs to see why the system failed, and what steps were taken to recover (e.g. PTFs that were applied after the crash, configuration changes, hardware replaced, etc.). The primary computer may then look up past customer information to determine if customer specific adjustments should be made. The primary computer may use the reply from the billing computer to adjust the standby resource bill according to the time the system was active. The system may then send the standby resource bill to the provider, which may send an invoice to the customer.

Similar adjustments may apply in instances where a computer system has not crashed, but still suffers a period of undesired performance. Namely, another embodiment consistent with the invention may adjust costs for using standby resources in response to determining that a system is running sub-optimally. Such subpar performance may result where the presence of a bug causes delays in system processing. For example, a recent upgrade accomplished on a computer may result in period where the system operates at half of a previous or expected level of performance. To compensate for the poor performance, several standby resources may activate, e.g., converting a computer from a two processor system to a four processor system. After a while, a PTF may be created to improve system performance back to the original or expected state. Encoded within the PTF may be resource usage, or billing information that may be used to determine a reduced cost. Such a reduced cost may take into account the operation of the standby resources that occurred during a period of time between when standby resource was enabled and the PTF was applied. A relatively smaller cost reduction may be accomplished in another instance where a performance improving PTF has been available, but a user has neglected applying the PTF to their system. As above, this cost determination may be accomplished using a combination of the billing information encoded in the PTF, as well as existing logs that track when a system was installed, upgraded, etc.

An embodiment consistent with the present invention thus provides a mechanism for determining a charge for using a standby resource that accounts for the cause for the resource's usage. More particularly, a standby resource, such as a processor, a complete computer system, etc., is activated in response to a resource requirement. The cause of the resource requirement is automatically determined and used to determine a charge indicator. A user may later be billed according to the determined charge indicator. As such, the user may be charged according to the cause of activating a standby resource and/or an associated usage status.

The charge indicator may be used to determine a cost that is billed to the user. In so doing, a determined cause may be logically associated to a code indicative of the cause. This determination may include correlating a code indicative of the cause and retrieved from a log to a rate used to determine the charge indicator and/or cost. The charge indicator may include a special rate pertaining to the customer, as well as a rate pertaining to the determined cause. Hardware and software environments suited for execution of such an embodiment are illustrated in FIGS. 1 and 2.

Hardware and Software Environment

Figure 2:
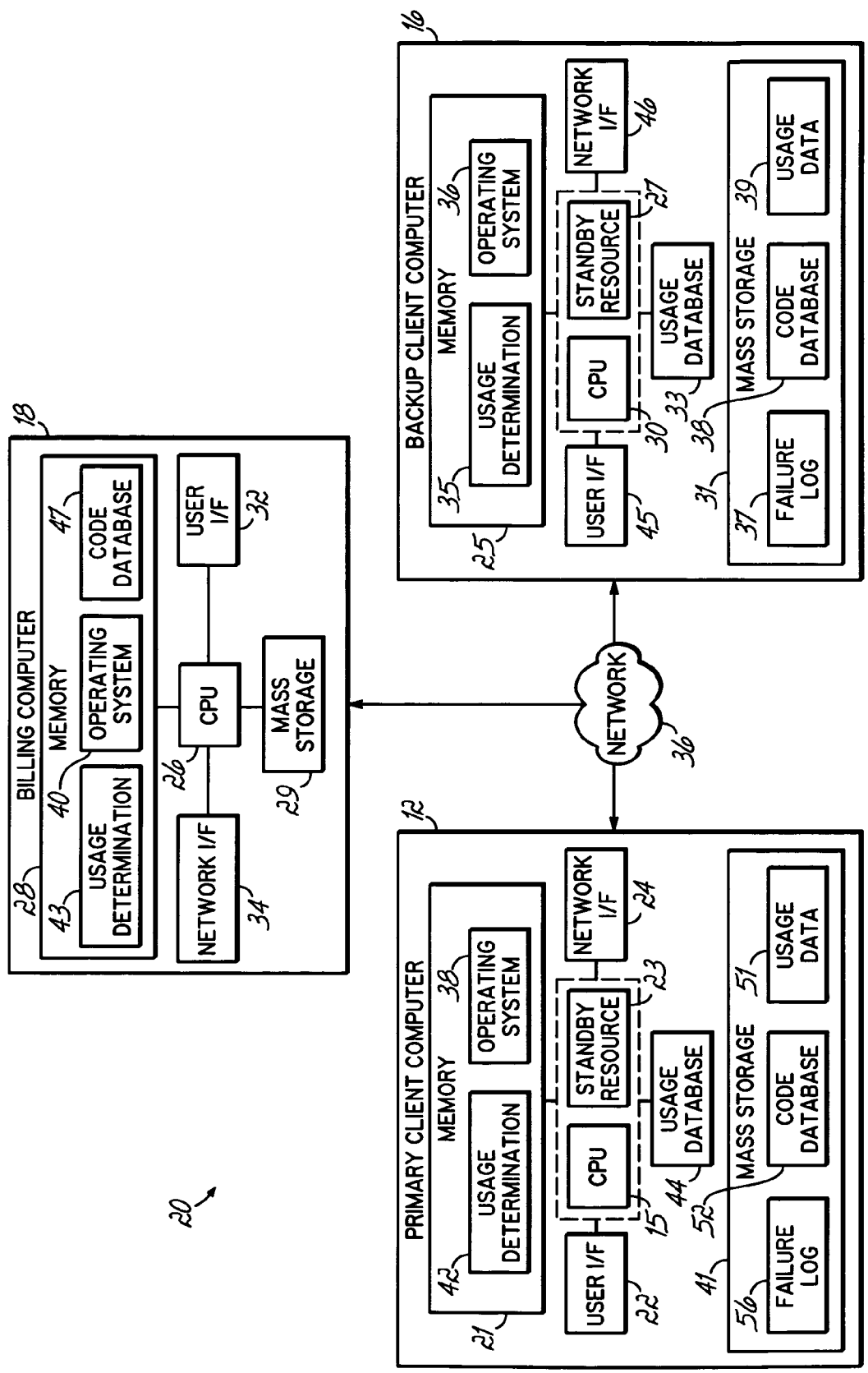
FIG. 2 is a block diagram of the primary hardware and software components of primary, backup and server computers of the system of FIG. 1.

Turning now to the Drawings, wherein like numbers may denote like parts throughout several views, FIG. 1 illustrates a networked computer system 10 configured to, in one respect, bill a user for their standby resource usage in a manner that accounts the cause of the resource's activation. As shown in FIG. 1, certain of the nodes, or computers, 12, 14, 16 and 18 of the system 10 may be configured in a distributed, or clustered computer environment. As such, the system 10 may be configured to mirror data from a primary node 12 to one or more backup nodes 14, 16, 18.

Clustering facilitates data mirroring and continuous availability. Clustered systems include computers, or nodes, that are networked together to cooperatively perform computer tasks. Clustering is often used to increase overall performance, since multiple nodes can process in parallel a larger number of tasks or other data updates than a single computer otherwise could. As appreciated by one skilled in the art, certain or all of the computers 12, 14, 16 and 18 shown in FIG. 1 may include standby resources 23, 27. Such standby resources 23, 27 may become activated in response to a resource or computing requirement, such as a need for increased processing power or memory. Moreover, certain computers 18, while capable of serving in the capacity of a backup role in some embodiments that are consistent with the invention, may include distinct functions within the system 10. One such function may include that of a provider server used for billing and service of the rest of the system 10. For instance, a billing node 18 of the system 10 may determine a cost to a client for utilizing the standby resources 23, 27. Furthermore, one skilled in the art will appreciate that an entire node or network of computers may also be considered to be a standby resource.

As shown in FIG. 1, the plurality of computers 12, 14, 16 and 18 are interconnected with one another via a network of intranet and Internet connections 11 and 13, respectively. Individual nodes 12, 14, 16 and 18 may be physically located in close proximity with other nodes, or computers, or may be geographically separated from other nodes, e.g., over a wide area network (WAN) and/or the Internet 13, as is well known in the art. State data held by each node 12, 14, 16 and 18 in the system 10 may be data that indicates whether that node is the primary member, the order of backup, e.g., first backup, second backup, etc., and the resources that a primary member needs in order to be active, e.g., necessary files, IP addresses, disks units, etc.

In the context of the clustered computer system 10, at least some computer tasks are performed cooperatively by multiple nodes executing cooperative computer processes (referred to herein as "jobs") that are capable of communicating with one another using cluster infrastructure software. Jobs need not necessarily operate on a common task, but are typically capable of communicating with one another during execution.

Any number of network topologies commonly utilized in clustered computer systems may be used in a manner that is consistent with the invention. That is, while FIG. 1 shows a clustered computer system 10, one skilled in the art will appreciate that the underlying principles of the present invention apply to computer systems other than the illustrated system 10. It will be further appreciated that nomenclature other than that specifically used herein to describe the handling of computer tasks by a clustered computer system using cluster infrastructure software may be used in other environments. Therefore, the invention should not be limited to the particular nomenclature used herein, e.g., as to protocols, requests, members, groups, messages, jobs, etc.

FIG. 2 illustrates an embodiment of a distributed computer system 20 configured to determine a cost for using standby resources 23, 27 in a manner that accounts for the reason for resource activation. More particularly, the system 20 includes at least one apparatus, e.g., one or more customer computers 12 and 16, and one or more billing computers 18. For the purposes of this invention, each computer 12, 16, 18 may represent practically any type of computer, computer system or other programmable electronic device capable of functioning within a distributed and/or a client-server environment. Moreover, each computer 12, 16 may be implemented using one or more networked computers, e.g., in a cluster or other distributed computing system. As is common in many distributed systems, multiple customer computers 12, 16 will typically interface with a given billing computer 18. While more capable computer systems may present advantages in certain embodiments consistent with the principles of the present invention, a suitable billing computer 18 for purposes of this specification may comprise any device configured to receive and process an electronic message transmitted from a customer computer 12, 16.

Customer computers 12, 16 may respectively include at least one central processing unit 16, 30 in addition to one or more standby resources 23, 27. As discussed herein, a suitable standby resource that is consistent with the principles of the present invention may include an allocatable component or function of a computing environment. As such, exemplary standby resources may include processors, memory, plugin cards, input/output controllers, adaptors or devices, and other hardware devices, among other components. Resources may also comprise multiple such components, e.g., processor cards including multiple processors coupled to local memory and other components, e.g., for a NUMA-based architecture. Also, as noted above, complete computer systems may be considered standby resources in some instances.

In the illustrated embodiment, standby resources 23, 27 are implemented as processors that remain dormant until temporarily activated by a user. In such a case, both the respective CPU's 15, 30 and standby processors 23, 27 may include at least one microprocessor coupled to respective memories 21, 25. Memories 21, 25 may represent the random access memory (RAM) devices comprising the main storage of computer 12, as well as any supplemental levels of memory, e.g., cache memories, non-volatile or backup memories (e.g., programmable or flash memories), read-only memories, etc. For instance, each memory 21, 25 may include program code 35, 42 configured to determine usage of standby resources 23, 27. In addition, each memory 21, 25 may be considered to include memory storage physically located elsewhere in the computers 12, 16, e.g., any cache memory in a processor in CPU 15, 30 or a smart card, as well as any storage capacity used as a virtual memory, e.g., as stored on a mass storage device 31, 41 or on another computer coupled to the computers 12, 16.

Computers 12, 16 typically receive a number of inputs and outputs for communicating information externally. For interface with a user or operator, each computer 12, 16 typically includes a user interface 22, 45 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal.

For additional storage, each computer 12, 16 may also include one or more mass storage devices 31, 41, e.g., a floppy or other removable disk drive, a hard disk drive, a direct access storage device (DASD), an optical drive (e.g., a CD drive, a DVD drive, etc.), smart card and/or a tape drive, among others. The exemplary mass storage 31, 41 may include a register or database 39, 51 that contains usage data generated according to standby resource activation. The mass storage 31, 41 may also include a failure log 37, 56 that stores codes indicative of an error or failure within the system 20, as well as another code database 38, 52 useful for associated the codes in the log 56 with a particular cause of a failure. As discussed in greater detail below, the system 20 may generate codes in response to failures, lagging performance, or other undesirable operation. Of note, one of skill in the art will recognize that the inclusion and distribution of the databases, files and other stored data may be altered substantially while still conforming with the principles of the present invention.

Each computer 12, 16 may furthermore include an interface 24, 46 with one or more networks (e.g., a LAN, a WAN, a wireless network, and/or the Internet, among others) to permit the communication of information with other computers and electronic devices. It should be appreciated that each customer computer 12, 16 typically includes suitable analog and/or digital interfaces between CPU 15, 30 and each of its respective computer components as is well known in the art.

Similar to customer computers 12 and 16, billing computer 14 includes a CPU 26, memory 28, mass storage 29, user interface 32 and network interface 34. As will be appreciated by one of skill in the art, billing computer 14 may comprise multiple computers of both a principle/lessor, as well as that of an agent/licensee.

Computers 12, 14 and 18 are generally interfaced with one another via a network 36, which may be public and/or private, wired and/or wireless, local and/or wide-area, etc. Moreover, network 36 may represent multiple, interconnected networks. In the illustrated embodiment, for example, network 36 may include the Internet. Such an arrangement facilitates ready access to information stored on the customer computers 12 and 16, as well as timely notifications and program updates.

Each computer 12, 16 and 18 operates under the control of an operating system 36, 38, 40 and executes or otherwise relies upon various computer software applications, components, programs, objects, modules, data structures, etc. Moreover, various applications, components, programs, objects, modules, etc. may also execute on one or more processors in another computer coupled to computer 12, 16 and 18 via a network, e.g., in a distributed or customer-billing computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. For instance, the embodiment of FIG. 2 includes program code 35, 42 configured to determine the usage of standby resources 23, 27. Complementary program code 43 may reside on the billing side, but one of skill in the art should appreciate that embodiments consistent with the principles of the present invention may nonetheless use program code resident at only one, or any number of locations.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Billing Adjustment Function

Figure 3:
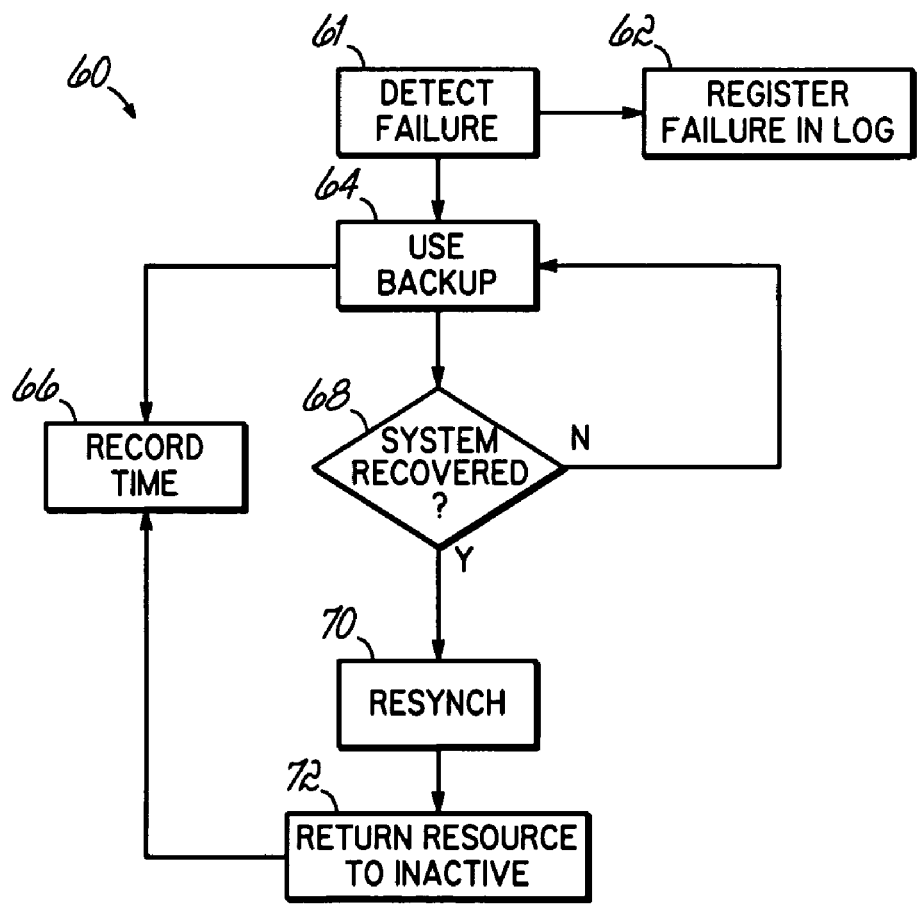
FIG. 3 shows a flowchart that includes a sequence of steps configured to manage the activation and deactivation of standby resources within the system of FIG. 1.

FIG. 3 shows a flowchart 60 that includes a sequence of exemplary steps configured to manage the activation and deactivation of standby resources within a clustered environment. The method steps are particularly suited for execution within a capacity on demand system such as is described in connection with FIGS. 1 and 2. Turning more particularly to the flowchart 60, the primary computer 12 may detect a failure at block 61. Typical causes of failures may include a hardware failure, such as that of a processor, memory or power unit. Other failures may result from a computer virus, or bug, in the operating system or other processing center. Still other causes may include an external loss of power and a failed disk drive.

As a failure occurs, background processes of the primary computer 12 identify the area or source of the failure and store a failure code associated with the source of the failure. That is, as the failure registers at block 61, the primary computer 12 may record the code or codes indicative of the failure in an electronic log 56 at block 62. Of note, most computers include backup power to allow the failure codes to be stored in memory 41 even during a crash.

In response to the failure detected at block 61, the primary computer 12 may activate a standby resource 23 at block 64. In the context of FIG. 2, such a standby resource 27 may include a backup resource, or a resource used to backup a failed resource, such as a CPU 15. Of note, while an activated standby resource 27 may be associated with a separate computer 16, one skilled in the art will appreciate that an alternative, acceptable standby resource 23 may be included within the same computer 12 that experienced the failure. In any case, the time of the failure is typically recorded by block 66. This recorded time entry may later be used to determine the duration of time that the standby resource 23 was active. This time window may later be used for billing purposes as discussed below in detail.

When the system recovers at block 68, re-synchronization processes known in the art may initiate at block 70 of FIG. 3. The standby resource 27 will generally be returned to backup status at block 72, as deemed appropriate by a user. Such backup status may include deactivation of the standby resource 27. The time of such deactivation may be recorded at block 66 on the primary computer 12 for accounting purposes. One skilled in the art will appreciate that the designations of one computer as a primary and the other as a backup in this specification are largely arbitrary, in that many systems consistent with the invention may concurrently operate multiple computers as backup and primaries for each other at any given time.

Figure 4:
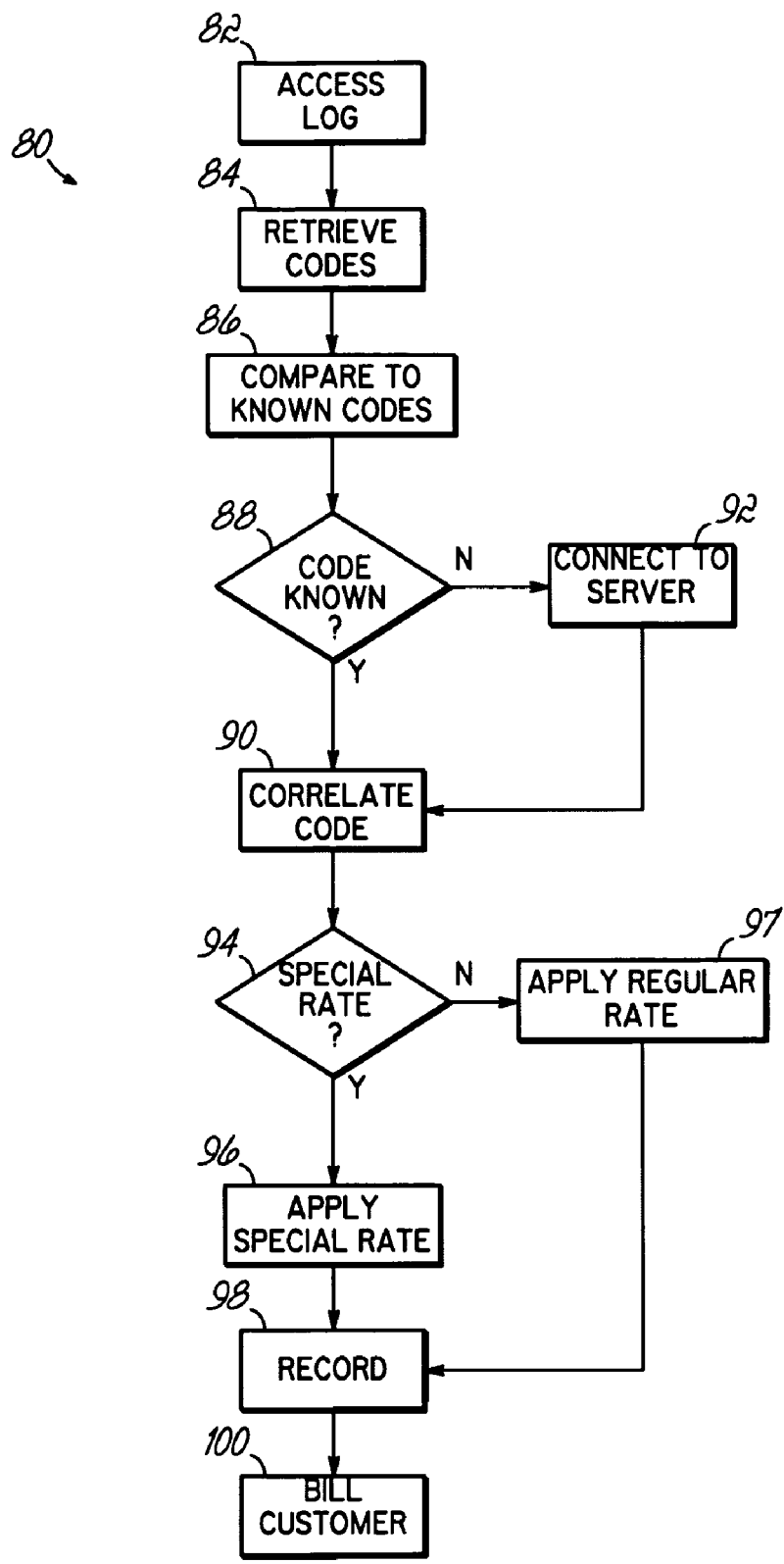
FIG. 4 shows a flowchart that includes a sequence of steps configured to determine a charge indicator used to modify an invoice according to a cause of a standby resource's usage within the system of FIG. 1.

The flowchart 80 of FIG. 4 shows an exemplary sequence of steps configured to determine a charge indicator used to modify an invoice for use of a standby resource. That is, the charge indicator is typically determined in a manner that accounts for the cause of the standby resource's usage. As with the steps of FIG. 3, the method steps of FIG. 4 may be executed by one or more computers shown in FIG. 1 or 2. More particularly, the steps of the flowchart 80 may be initiated by a primary computer 12 in response or otherwise subsequent to a detected failure. After such a failure occurrence, the primary computer 12 may access its electronic log 56 at block 82. The electronic log 56 includes a listing of failure codes associated with one or more causes of a failure. Such codes are conventionally downloaded in the event of a failure. In this context, an embodiment consistent with the present invention is compatible with and capitalizes on conventional systems and practices.

The codes are retrieved from the electronic log at block 84. Retrieval of the codes may include the operating system 38 of the primary computer 12 accessing the electronic failure log 56 to read the recorded failure code(s).

At block 86, the operating system 38 may compare the retrieved codes to known error codes. Such a comparison may be accomplished locally or remotely from the primary computer 12. For instance, the operating system 38 of the primary computer 12 may compare codes retrieved from the log to a local database of stored codes. In another embodiment consistent with the invention, the comparison of block 86 may also include connecting to a remote server to retrieve known codes for comparison to those retrieved at block 84. Where the retrieved code is unknown at block 88, the primary computer 12 will typically connect to a remote server 18 at block 92. The database 47 of the remote server 18 will typically include more code choices and/or may involve technical assistance from a billing administrator.

In any case, a typical comparison includes concurrently or sequentially associating the retrieved code to a stored failure code read from a database. More particularly, the code is correlated to a charge indicator at block 90 stored within the database. As discussed herein, the charge indicator may include information associated with a cause of the failure and/or activation of the standby resource. Of note, while block 90 of the flowchart 80 is typically accomplished locally at the client computer 12, one skilled in the art will appreciate that such correlation could be accomplished remotely at one or more computers.

The charge indicator may also include information pertaining to a user. Such information may include a special billing status. Determination of a special rate at block 94 may include evaluation of the charge indicator comprising an attribute. Such attributes may be assigned to special customers, such as those of high volume or high visibility. In any case, the rate may be applied at block 96 and recorded at block 98 for accountability purposes. A customer may be subsequently billed at block 100 according to the applied rate. As discussed herein, the applied rate may reflect the actual usage of a standby resource.

Figure 5:
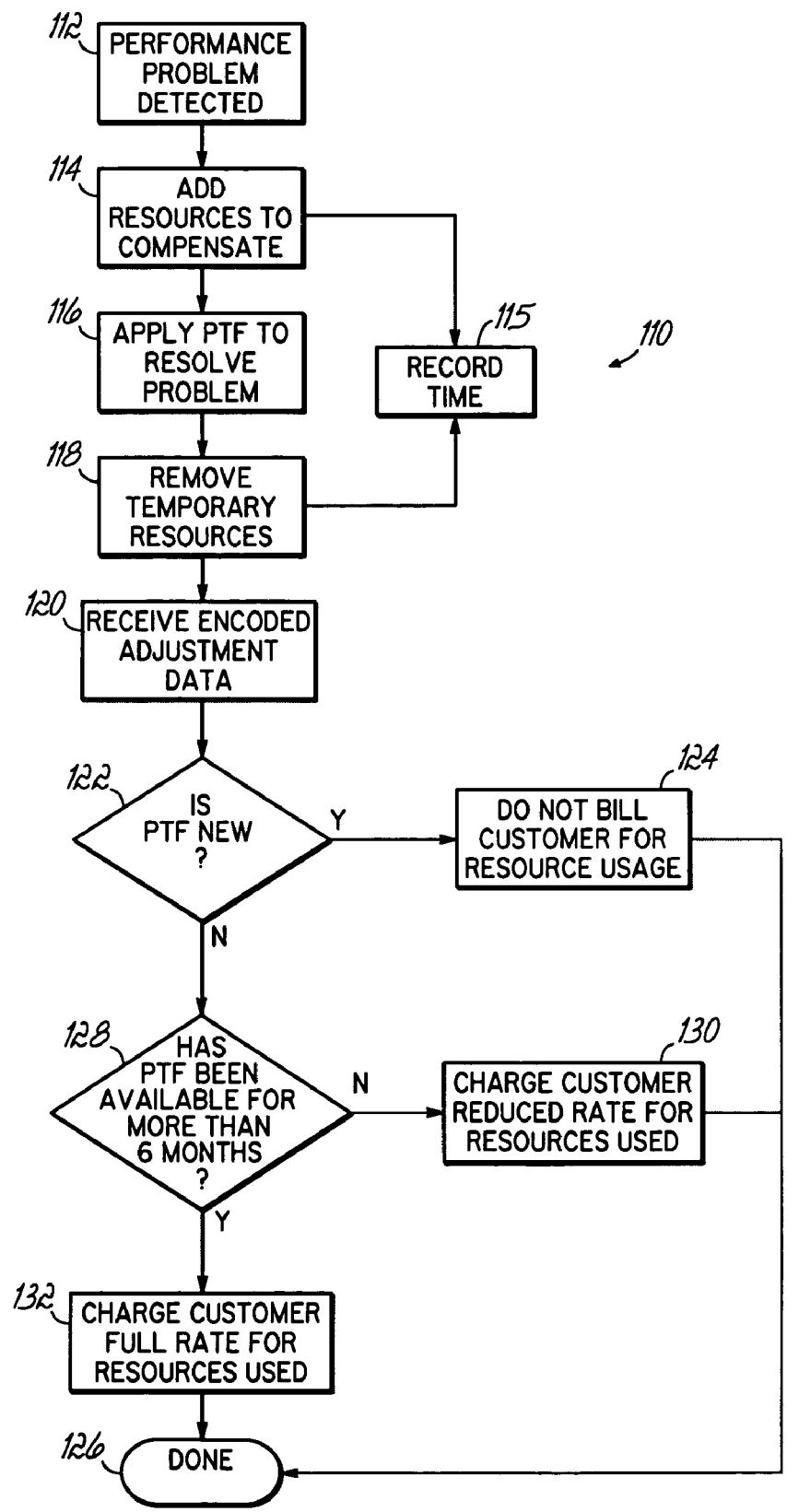
FIG. 5 shows a flowchart that includes a sequence of steps configured to determine a charge indicator according to system and user performance within the system of FIG. 1.

In some instances, one or more failures may lead to poor operation, rather than a crash. Standby resources may become activated in response to such poor performance. FIG. 5 shows a flowchart 110 having exemplary sequence steps configured to determine a charge indicator according to system and user performance. Namely, a performance problem may be detected at block 112 of FIG. 5. Detection of the performance problem may include an electronic warning signal or user feedback, for instance. That is, an operating system may detect that a particular process is taking longer than some predetermined time window. In another example, a customer administrator evaluating performance output during a routine performance review may question the efficiency of a particular process. Where undesirable or otherwise unexpected performance is detected at block 112, a system 20 will often add or otherwise activate standby resources 23 at block 114 to compensate for the poor performance at block 114. The time at which the standby resource 23 is activated at block 114 may be recorded at block 115 for accounting purposes.

Where desired, a service provider may create and deliver a PTF to the system 20 to resolve the poor performance. A PTF may include a programmatic augmentation or replacement of software that is downloaded on a system to improve program performance. PTF's may be developed and delivered to a client routinely over time, or may be developed in response to a specific problem experienced by the client. Where the PTF is successful, the need for the activation of the temporary resource 23 may be eliminated. Consequently, the temporary resource 23 may be removed at block 118. The time at which the resource 23 is inactivated may be recorded at block 115.

Encoded adjustment data entered and stored in response to the detection of the performance at block 112 of FIG. 5 may be retrieved at block 120. For instance, such adjustment data may be encoded in the PTF delivered at block 116 of FIG. 5. The encoded adjustment data may be used to reduce costs associated with activating a standby resource. Such adjustment data may indicate, for instance, if the PTF was new. Where such is the case at block 122, it is generally true that the problem was new, as well. Such a scenario statistically may indicate that the performance problem may have been caused by less than optimum programming provided by the service provider. As such, the customer of the embodiment of FIG. 5 may not be billed for their temporary resource usage at block 124.

Where the adjustment data alternatively indicates that a PTF has been available for more than six months as shown at block 128, then a customer at block 130 may be charged a reduced rate for resources used. Such may be the case where a customer was tardy or unnecessarily delayed downloading or applying the PTF that would have otherwise mitigated the sub-par performance detected at block 112. As shown at block 128, the duration of one such delay may last up to six months.

Where the PTF has been available for more than six months at block 128 of FIG. 5, and yet the customer has still not applied it, then the customer may be charged the full rate at block 132 for the resources used. One skilled in the art will appreciate that the billing scenarios ending at block 126 of FIG. 5 are merely for exemplary purposes and that virtually any number of alternative billing structures may be alternatively and/or additionally employed where applicable.

While the present invention has been illustrated by a description of various embodiments and while these embodiments have been described in considerable detail, it is not the intention of the applicants to restrict, or in any way limit, the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method for determining a cost for using a standby resource in a computer system, wherein the standby resource is activated in response to a resource requirement, the method comprising:
    automatically determining a cause of the resource requirement, wherein determining the cause of the resource requirement further includes detecting an occurrence of a failure;
    retrieving a code associated with the determined cause from an electronic log;
    in response to retrieving the code, correlating the code to a charge indicator, wherein the charge indicator pertains at least in part to the determined cause, and wherein the charge indicator includes a reduced rate relative to another charge indicator that is correlated to another code that is associated with a cause other than a cause associated with an occurrence of a failure;
    in response to automatically determining the cause of the resource requirement, determining a duration of standby resource activation; and
    determining the cost for using the standby resource according to the charge indicator and the duration of standby resource activation such that the cost for using the standby resource is reduced relative to if the cause of the resource requirement was for other than an occurrence of a failure.

2. The method of claim 1, further comprising billing a user according to the determined cost.

3. The method of claim 1, wherein determining the cost for using the standby resource further includes automatically determining the cost.

4. The method of claim 1, wherein determining the duration of standby activation further includes recording at least one of a time the standby resource was activated and a subsequent time that the standby resource was inactivated.

5. The method of claim 1, wherein determining the cause of the resource requirement further includes detecting a performance problem.

6. The method of claim 1, wherein determining the cause of the resource requirement further includes retrieving encoded adjustment data from a memory in communication with the computer.

7. The method of claim 1, wherein determining the cause of the resource requirement further includes recording a code relating to the cause in an electronic log.

8. The method of claim 1, wherein determining the cause of the resource requirement further includes retrieving at least one of the code and adjustment data from a remote memory.

9. The method of claim 1 wherein determining the occurrence of the failure further includes determining the occurrence from a group consisting of: a disk drive failure, a bug, a power loss, an indication of performance, an ineffective program fix, a user related error, a hardware related error and a software related error.

10. The method of claim 1, wherein the standby resource is a first standby resource that is activated in response to a first resource requirement, wherein the charge indicator is a first charge indicator, and wherein the method further comprises, in response to activating a second standby resource in response to a second resource requirement:
    automatically determining a cause of the second resource requirement, wherein determining the cause of the second resource requirement further includes detecting a cause other than an occurrence of a failure;
    retrieving a second code associated with the determined cause of the second resource requirement from the electronic log;
    in response to retrieving the second code, correlating the second code to a second charge indicator pertaining at least in part to the determined cause of the second resource requirement, wherein the second charge indicator includes a higher rate relative to the first charge indicator;
    in response to automatically determining the cause of the second resource requirement, determining a second duration of second standby resource activation; and
    determining a cost for using the second standby resource according to the second charge indicator and the second duration.

* * * * *